(12) United States Patent
Roy

(10) Patent No.: US 11,290,426 B2
(45) Date of Patent: Mar. 29, 2022

(54) BLOCK CHAIN NETWORK AND HASH-BASED CUCKOO FILTER

(71) Applicant: The Government of the United States, as represented by the Secretary of the Army, Washington, DC (US)

(72) Inventor: Radhika Roy, Howell, NJ (US)

(73) Assignee: The Government of the United States, as represented by the Secretary of the Army, Washington, DC (US)

(*) Notice: Subject to any disclaimer, the term of this patent is extended or adjusted under 35 U.S.C. 154(b) by 309 days.

(21) Appl. No.: 16/442,627

(22) Filed: Jun. 17, 2019

(65) Prior Publication Data

US 2020/0396209 A1 Dec. 17, 2020

(51) Int. Cl.
*H04L 29/06* (2006.01)
*H04L 9/06* (2006.01)
*H04L 9/32* (2006.01)

(52) U.S. Cl.
CPC ........ *H04L 63/0414* (2013.01); *H04L 9/0643* (2013.01); *H04L 9/3242* (2013.01); *H04L 63/0428* (2013.01); *H04L 2209/38* (2013.01); *H04L 2463/041* (2013.01)

(58) Field of Classification Search
CPC . H04L 63/0414; H04L 9/0643; H04L 9/3242; H04L 63/0428; H04L 2209/38; H04L 2463/041; H04L 9/30; H04L 9/0637; H04L 9/0618; G06F 16/1824; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

| | | | |
|---|---|---|---|
| 2013/0191648 A1* | 7/2013 | Bursell | H04L 9/0822 713/189 |
| 2013/0262868 A1* | 10/2013 | Friedman | G06F 21/72 713/171 |
| 2020/0106767 A1* | 4/2020 | Robinson | H04L 67/306 |
| 2020/0213292 A1* | 7/2020 | Cage | H04L 9/0894 |
| 2020/0265915 A1* | 8/2020 | Harms | G11C 29/44 |

OTHER PUBLICATIONS

Ismail et al., Evaluation and Blockchain Taxonomy, Mar. 15, 2019, ICBCT 2019: Proceeding of the 2019 International Conference on Blockchain Technolog, pp. 30-38, retrieved from internet, [https://doi.org/10.1145/3320154.3320156] (Year: 2019).*

* cited by examiner

*Primary Examiner* — Malcolm Cribbs
(74) *Attorney, Agent, or Firm* — Ronald Krosky

(57) ABSTRACT

Various embodiments that pertain to an enterprise network that employs a block chain portion and a non-block chain portion. For a single transaction, a header of the transaction can be sent over the block chain network and the non-header of the transaction can be sent over the non-block chain network. A hash-based cuckoo filter can be used for communication of the header along the block chain network.

20 Claims, 9 Drawing Sheets

BLOCK CHAIN NETWORK AND HASH-BASED CUCKOO FILTER

GOVERNMENT INTEREST

The innovation described herein may be manufactured, used, imported, sold, and licensed by or for the Government of the United States of America without the payment of any royalty thereon or therefor.

BACKGROUND

Information can be communicated along a network. Some of this information can be sensitive in nature. A sender and/or receiver of the sensitive information can have a desire for the information to be protected and not accessible to anyone. Therefore, it can be beneficial for communication of information to be secure.

SUMMARY

In one embodiment, a system can comprise a network component configured to manage a block chain network with a block chain-based network architecture. The system can also comprise a hash component configured to use a hash-based cuckoo filter for a transaction set for the block chain network. The network component, the hash component, or a combination thereof can be implemented, at least in part, by way of non-software.

In another embodiment, a non-transitory computer-readable medium can be communicatively coupled to a processor and can store a command set executable by the processor to facilitate a component set. The component set can comprise a block chain network component configured to send a header of a block over a block chain network. The component set can also comprise a non-block chain network component configured to send a non-header of the block over a non-block chain network. The block chain network and the non-block chain network can be part of an enterprise network. The header of the block can be encrypted by way of a hash-based cuckoo filter.

In yet another embodiment, a system can comprise a source node component configured to send a first transaction along an enterprise network and a destination node component configured to receive a second transaction by way of the enterprise network. The first transaction and the second transaction can be non-identical and the enterprise network can comprise a block chain network and a non-block chain network. Part of the first transaction can be sent along the block chain network, part the first transaction can be sent along the non-block chain network, and the part of the first transaction that can be sent along the non-block chain network can be encrypted by way of a hash-based cuckoo filter. Part of the second transaction can be received along the block chain network, part the second transaction can be received along the non-block chain network, and the part of the second transaction that can be sent along the non-block chain network can be encrypted by way of the hash-based cuckoo filter. The source node component, the destination node component, or a combination thereof can be implemented, at least in part, by way of non-software.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
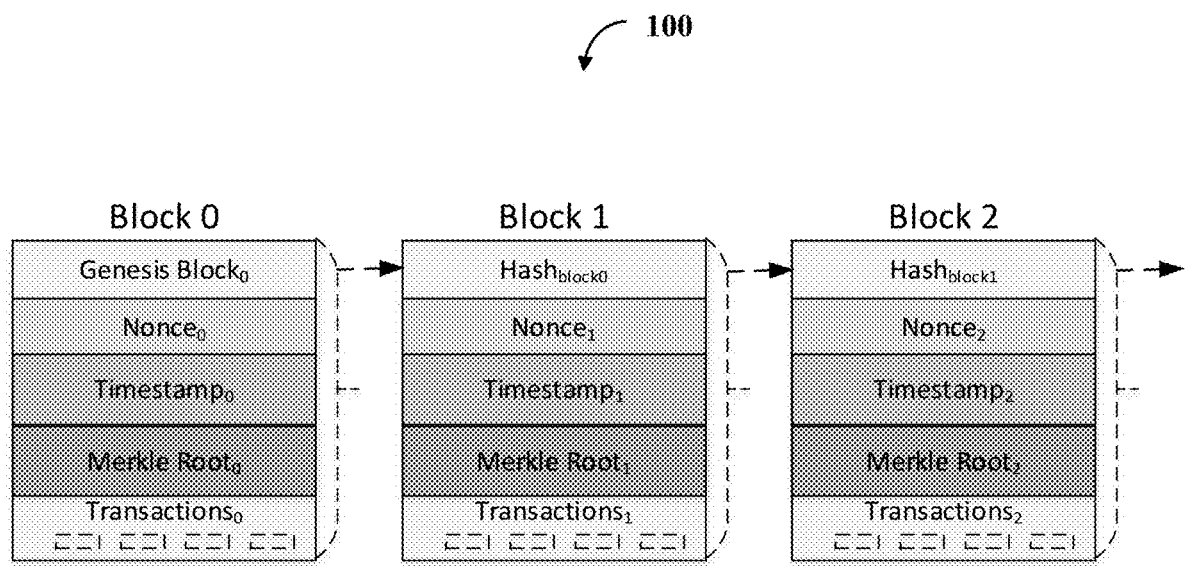
FIG. 1 illustrates one embodiment of a block chaining mechanism.

An enterprise network can include a block chain portion and a non-block chain portion. For a block or transaction, a header can be transmitted over the block chain portion and the remainder can be communicated over the non-block chain portion. For communication of the header, a hash-based cuckoo filter can be employed.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 2:
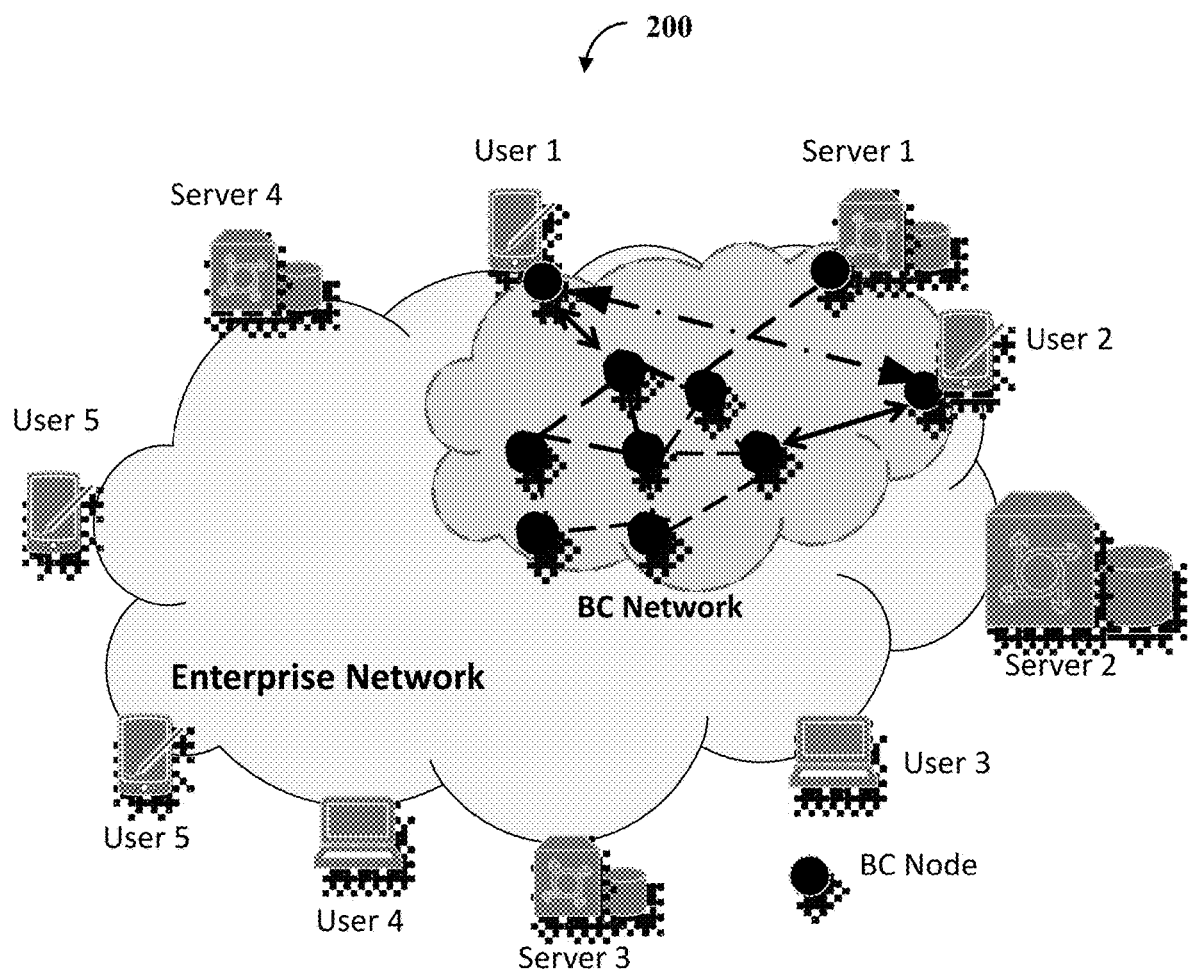
FIG. 2 illustrates one embodiment of a block chain-based network architecture framework.

FIG. 1 illustrates one embodiment of a block chaining mechanism 100 and FIG. 2 illustrates one embodiment of a block chain-based network architecture framework 200. The hash-based decentralized peer-to-peer blockchain (otherwise known as "block chain") can provide immutable secure transfer of information over the open public Internet. Secure hash-based flexible cuckoo filter data architecture technology can enable a high bandwidth-efficient transfer of information over the network. A generalized application-agnostic framework of a permissioned blockchain-based enterprise network architecture can be employed to achieve security. Distributed key and storage management, blockchain signaling protocol(s), block-level application layer routing protocol(s), scalable consensus algorithm(s), peer-to-peer and client-server hybrid networking, and filters in transactions can be used to reduce messaging overhead. Blockchain-specific cyber-attacks can be mitigated. Additionally, network design criteria using trade-offs between security and performance parameters can be used. A signature sharing application is used as example showing the design trade-offs at a very high-level.

Cyber-attacks can be a key concern in networking environments such as the example enterprise networks of the public Internet, private enterprise networks, military networks, and commercial networks. A hash-based blockchain (BC) can be one of the most secure networking technique against cyber-attacks. Although commercial users can be provided with multi-mega/gigabit connections, military users often lack access to high-speed bandwidth connections especially in mobile wireless combat situations. A secure hash-based cuckoo filter (CF)-data architecture offers the tremendous promise to provide the most bandwidth-efficient secure communications. In view of this, a new kind of application-agnostic network architecture framework can be employed by combining BC and CF technologies for enterprise networks.

In view of the ever increasing frequency of colossal cyber-attacks over the public Internet, BC has the capability to provide relatively immutable security even considering the entire communications networking environment is untrustworthy. BC networks can be permission-less (e.g., public) and permissioned (e.g., private that relies on authorized nodes). BC nodes can work in a peer-to-peer (P2P) decentralized communications architecture. The distributed data structure of BC comprises a chain of blocks termed as transactions that are transferred over the networks as illustrated with the block chaining mechanism 100. The first block (Block 0) can be known as the genesis block. The genesis block can be configured to be the only block that does not contain the hash value of the previous block. The genesis block can be the foundation the mechanism 100 can be configured, in at least one embodiment, such that any block that does not conform with this block will nullify the whole chain of blocks which will be eliminated from a system. The transactions can be time stamped and bundled into blocks where an individual block can be identified by its cryptographic hash. The blocks form a linear sequence where an individual block references the hash of the previous block, forming a chain of blocks called the BC. Note that the genesis block #0 can be defined with zero block-height while block #1 and #2 can be defined having the height of one and two, respectively, and so on. When a transaction is received by a BC node, the node broadcasts the same transaction to other nodes in the BC network. A transaction is verified by an individual BC node by validating the signatures contained within the transaction.

Appending a new transaction to the BC (e.g., mining) can entail solving a computationally demanding, hard-to-solve, and easy-to-verify puzzle usually termed as a proof-of-work (POW). This puzzle underpins a trustless consensus algorithm among untrusted nodes. The computational resources to participate in the consensus algorithm (e.g. POW) can be very significant, which restricts the number of blocks that can be mined by a node and thus offers protection against malicious mining of blocks. A BC can be maintained and stored by BC nodes of the network and in individual BC node can execute and record the same transactions/blocks. An individual miner can append the verified transaction to its own pending block of transactions that are waiting to be mined. The chain of blocks can be replicated among the BC nodes in the network. An individual node in the network can read the transactions/blocks. The chaining used in BC ensures the immutability by using the hash of the previous header block hash in the current block. The header can include the root hash of the Merkle tree of the transactions in the block in addition to others as illustrated in FIG. 1.

This way transactions cannot be changed without changing the root Merkle hash and then invalidating the block. The robustness of the BC is ensured by the idea that multiple miners (e.g., BC nodes) process a single transaction. In addition to ensuring an immutable and robust capability for operations in trustless environments, the BC network has a distributed peer-to-peer (P2P) communications architecture.

A private permissioned BC network can be employed where an individual entity can be required to have permission to enter or join to the network. In this way, a lightweight consensus algorithm can be employed that requires very minimal or negligible computational resources. Functional entities can communicate with each other over the network (e.g., enterprise network) using issued shared keys. A users' devices, hosts, or other functional entities can be connected to the network. The transactions can be grouped together and mined in units of blocks. The designated miner nodes in the BC network can be mining the transactions/blocks.

A cuckoo filter data architecture can be used for the efficient passing of transactions over the BC network. The cuckoo filter supports adding, removing, and retrieving selected items dynamically for applications that store many items and target moderately low false positive rates (FPR) in errors in sending the information. The small fraction of false positive probability of bit-error-rate (BER) can be considered acceptable as error-correction combined with recovery of data through selective retransmission schemes are used. In one hardware implementation of aspects disclosed herein, a centralized master sever can be coupled with some supporting sub-servers perform the signature distribution to their client users.

In view of this, aspects disclosed herein can provide a single comprehensive BC-based network architecture framework that can accommodate various applications and broad network design trade-offs considering both security and performance parameters. The generalized BC-based network framework discussed herein can address these important technical issues. This can facilitate a complete BC-based application-agnostic networking architectural framework.

Immutable secure communication over the enterprise network can be the primary objective of military networks. It can be desirable to prove and validate independently whether the information sending from the sender to the receiver maintains provenance and is immutable. BC provides a valuable mechanism for achieving immutability. Of course, it can have a cost because it can include a relatively large amount of hash processing power with relatively high communication delays. As an example, the delay can be around 10 minutes/transaction over a public network. This problem makes BC on their own unusable for real-time communications over the network. The network can be designed to overcome this problem of the BC network. The overhead traffic generated by the BC network that contains only the header of a transaction/block is relatively small in comparison to that of the traffic that contains both header and payload of a transaction/block directly sent over the non-BC network. In turn, the header-only delays are much less than the header and payload delays. Moreover, the wireless network has the bandwidth scarcity especially in mobile networking situations. In view of this, the block chain-based network architecture framework 200 can be employed.

An overall enterprise network architecture framework can be within which a BC network that can act as an overlay signaling network. Unlike a public implementation whose management is decentralized, the architecture 200 can implement as a permissioned BC network managed by an authority such as the owner of the network. The BC nodes that form the BC network can be permitted access by a controlling authority. Users can obtain permission from the controlling authority to connect their devices within the BC network. The BC network can implement security features for when BC nodes are dynamically and/or statically added, removed, or reintroduced. One feature that can be practiced for the architecture 200 is the distribution of keys from the certificate authority (CA).

In view of the BC, the role of the centralized CA/controller can be removed for distribution of keys/certificates dynamically in real-time. The decentralized BC network can be capable of doing this job efficiently. Since the BC network can be managed by an authority, the CA/controller can, in at least one embodiment, have some static role for adding and removing network entities (e.g. devices/hosts/servers). BC nodes can communicate with each other if the authority/controller allow permission by giving them shared keys (e.g. by way of the Diffie-Hellman algorithm). In addition, a block can have a policy header. The nodes of the BC network can works at the transaction and block-layer level. That is, it is above the network (e.g. IP) and transport-layer (e.g. TCP/UDP).

An individual BC node can be connected to an IP router. With this, an application layer signaling protocol can be used between an entity (e.g. user, server, and host), the BC node, and amongst the BC nodes. Different protocols can be employed, such as P2PSIP or a protocol specifically optimized for the BC network. This way, if a device/server/server itself wants to be a BC node, it may do so. For example, a host itself can manage a lot of sensors with the Internet-of-Things (IOT) and create transactions and blocks based on the time-series nature of sensors' traffic. In view of this, traffic that is transferred over the BC network can be signaling traffic, while the traffic that is sent over the non-BC network can be designated as the payload traffic.

Centralized public key infrastructures (PKIs) can be susceptible to a single-point-of-failure due to software and hardware faults or malicious attackers. A P2P decentralized BC architecture can offer PKI services including privacy-protection that are reliable while protecting against those failures. In one embodiment, in individual BC node can have a public key (PK). The users can also be using the PK and secret (private) key (SK) pair for data transfer, access, and storage over the enterprise network including the BC network. The SK can be used for signing the transaction. The BC network can be configured to dynamically generate, remove, and recertify in accordance to security policy mandated by the CA. In one embodiment, the BC network can be used for all key management purposes including generation of the encryption key (EK) for the entire enterprise network (both BC and non-BC); however at least some key management purposes can be handled elsewhere. Multiple signatures (multisig) can be used to achieve this.

Permissioned entities (device/host/server) can store data in the BC network (e.g., only permissioned entities). The unique block number and hash of stored data can be used by the entity for authentication. If the storage can successfully locate data with a given block-number and hash, then the user can be considered authenticated. The received data packets can be stored in the order they come in blocks along with the hash of stored data. The new block number can be encrypted using a shared key generated by the algorithm (e.g. Diffie-Hellman) ensuring that whoever possesses the key is the only one who knows the block number and the true entity of the block-number. Many schemes related to sorting/searching/querying/accessing storage data can be devised based on different kinds of data. Note that BC can provide a historical-log of events; a variety of services can be created for sharing the data stored in the BC network.

Transfer of the transaction or block over the BC network can employ an application layer signaling protocol. The BC network acts as a decentralized P2P distributive architecture. In view of this, the peer-to-peer BC network can implement as a P2P-BC network characterizing its basic networking properties. The P2P session initiation protocol (P2PSIP) can be over the BC network. This can lead to a unique match for using the P2PSIP for the P2P-BC because both operate using the same P2P communicating architecture. In one embodiment, the signaling traffic that only contains the hash of the block/transaction header termed as signaling traffic goes via the BC network, but the actual encrypted payload data transaction along with signature hash goes directly to the destination via the non-BC part of the IP enterprise network. The transaction/block header that goes via the BC network can be mined by the BC nodes before going to the destination. A transaction can be configured to only be accepted as valid if and when the destination entity compares and finds that the received actual payload transactions sent directly from the source entity and the validated transactions sent by the BC network are the same.

The enterprise network can comprise wire-line and/or wireless communications environments, and the connected networking entities can be static and/or mobile. In one example, vehicular transportation networks and tactical mobile networks, each of which can form a mobile ad hoc network (MANET), can also communicate inherently in a P2P fashion. In MANETs, the network topology can be dynamically created, torn down, and re-established. P2P-BC networks offer tremendous opportunities for robust cybersecurity.

The proposed end-to-end IP-based enterprise network upon which the application layer-based BC network can be connected by using IP routers. In the same token MANETs and non-MANETs networks can be connected as a part of the IP-based enterprise network. Similarly, both decentralized P2P applications and C/S applications can be connected over the same IP-based enterprise network.

A broadcast scheme for routing over the BC network. The application layer signaling protocol (e.g., P2PSIP) can be used for transferring transactions/blocks over the BC network. In P2PSIP, modified chord-based distributed hash table (DHT) protocol can be used. The DHT can use a unicast routing protocol between the BC nodes for transferring the transactions/blocks. The modified chord can be one of multiple choices. In addition to the application layer (logical) DHT routing protocol, IP network layer (physical) routing (e.g. OSPF, BGP) protocol can be between the routers of the enterprise network over which BC nodes are connected. Therefore, unicast routing protocol for both BC nodes and IP routers can be used.

The hash-based bandwidth-efficient cuckoo filter (CF) data architecture can be for the proposed enterprise network 200. Tables I and II provide salient example technical features of the CF technical parameters and design tradeoffs, respectively.

TABLE I

CUCKOO FILTER PARAMETERS

| Parameters | Description |
|---|---|
| $\in$ | Target false positive rate (FPR) |
| f | Hash/Fingerprint of any given transaction in bits |
| α | Load factor (0 ≤ α ≤ 1) |
| b | Number of entries per bucket |
| M | Number of buckets |
| n | Number of transactions |
| C | Average bits per transaction (also known as the cost per transaction) |

TABLE II

CUCKOO DESIGN TRADEOFFS

| Description | Performance |
|---|---|
| Minimum Hash/Fingerprint size | $f < \log_2 M$ bits |
| For Optimal Bucket Size | |
| Average bits per transaction | $C = \dfrac{f}{\alpha}$ bits/transaction |
| Larger buckets improve table occupancy | higher b → higher α |
| Larger buckets require longer hashes/fingerprints for the same $\epsilon$ | higher b → higher f |
| Probability of false fingerprint hit (upper bound) | $\dfrac{2b}{2^f} < \varepsilon$ |
| Minimal hash/fingerprint size f | $f \geq \left\lceil \log_2 \dfrac{1}{\varepsilon} + \log_2 2b \right\rceil$ bits |
| Upper bound of space cost C | $C \leq \dfrac{\left\lceil \log_2 \dfrac{1}{\varepsilon} + \log_2 2b \right\rceil}{\alpha}$ bits/transaction |

TABLE II-continued

CUCKOO DESIGN TRADEOFFS

| Description | Performance |
|---|---|
| Optimal bucket size b | Choose b to satisfy $\epsilon$ (only 2 hash functions) |

Instead of using the actual payload of an individual transaction, the hash/fingerprint of the individual transaction can be used to conserve critical bandwidth resources. A desirable (e.g., optimum) filter size can be employed that considers a desirable bucket size (e.g., the number of entries of hashed transactions), b, subject to the FPR constraints. FPR indicates the bit-error-rate (BER) probability to be tolerated by a given application. It is seen that a group of transactions can be accommodated in one filter or multiple filters. Note that a composite filter can be created by combining two or more filters. For example, a master host can combine many filters received for a set of sub-hosts and then send the composite filter back to a group of clients.

The use of filters for transactions can depend on types of applications. For example, database applications, file transfer, sensor-based time series-traffic, signature sharing applications, massive data transfer, application sharing, and many others can benefit in saving enormous bandwidths and therefore a filter can be applied. However, real-time conversational applications like telephony, audio-video conferencing, and others may not be suitable for filtering.

Transactions can be designed to encapsulate key transfer materials from the source entity (SE) to destination entity (DE). The signature using the sender's SK can be used to maintain the authentication, integrity and nonrepudiation of the transaction. An example transaction format is shown in Table III.

TABLE III

TRANSACTION FORMAT

Hashed result of the transaction
Number of this transaction in block
Sender Identity (SI)
Destination Identity (DI)
Signature of this transaction to ensure integrity and authentication
Signature{Cipher + Destination entity identity}$SK_{SI}$
Payload: (Encrypted Transaction Information)
Cipher = Encryption {Information = Cuckoo Filter}$PK_{DI}$ The information payload of the transaction can comprise the cuckoo filter instead of the actual payload. A cipher can be created encrypting the cuckoo filter using the PK of the destination entity. Encrypted privacy related information combined with digitally signed transaction contents ensure that an adversary may struggle to act as a normal BC node or a malicious user can struggle to read anything from the encrypted message. In one embodiment, only the destination entity has the key to decrypt the information.

An example block header is shown in Table IV consisting of a couple of fields. The second field links the block to its parent block. This field helps blocks linking to each and creating a chain structure as described earlier.

TABLE IV

BLOCK FORMAT

| Field | Description |
| --- | --- |
| Version | Block Version Number |
| Previous Block Hash | Hash of the previous block in the chain |
| Merkle Tree Root | Hash of the Merkle tree root |
| Timestamp | Creation time of this block |
| Targeted Difficulty (or other parameters) | The Proof-of-Work difficulty target or other parameters based on type of consensus algorithm used |
| Nonce | A counter for the Proof-of-Work |

Block Payload (Transactions = Cuckoo Filters)
Trans. ($CF_1$) # 1, Trans. ($CF_2$) # 2, . . . , Trans. ($CF_n$) # n
Note:
Information (payload) is fingerprinted;
One CF can contain one or more fingerprints;
One CF = One Transaction The transactions in the block can be merged into the Merkle tree root that assures the integrity of transactions as any alteration on transactions can be configured to cause a totally different value of the Merkle root value as stated in the BC section. Time tampering can be prevented by checking the timestamp field that is timestamped permanently. In a salient example, with a commercial network, the devices and the security guarantees (e.g., validations of the transactions/blocks through mining by BC nodes) can be equivalent to coins and rewards, respectively in our proposed BC-based enterprise network.

An example implementation can also use the simple POW consensus algorithm. A one-way cryptographic hash function, double SHA256, dhash( ), can be used to calculate the POW where the double hash is calculated as follows:

hashed result=dhash(input)=SHA256(SHA256(input)).

This procedure can be termed as mining in the BC network. A large amount of computational resources can be used to prevent double-spending problems. Double-spending can be used where two different transactions sent into the BC network are trying to spend the same account balance. However, as an alternative, a simplified version of the POW algorithm can be used for the BC network that defines the difficulty parameter in finding the hash value with the number of leading zeros.

The hash of the block header can be calculated by BC nodes. This candidate block header can be hashed repeatedly using different nonce values until the resulting hash value starts with the number of zeros that matches the difficulty requirement. The permissioned BC network that can function without double-spending problems, and two or three leading zeros of POW may be sufficient. In addition, other consensus algorithms such as proof-of-stake (POS), practical byzantine fault tolerant (PBFT), delegated proof-of-stake (DPOS), Ripple, Tendermint, algebraic consensus algorithm (ACA), and others can be employed. In one embodiment, ACA can be used (e.g., consensus: [X. Y]+[Y. Z]+[X̄. Z]=X. Y+X̄. Z; [Y. Z]'s consensus overlaps with that of other two groups; so it can be eliminated).

Public BC networks can be vulnerable to cyber-attacks based on 51% attacks; attacks such as double-spending, distributed denial-of-service (DDoS), and selfish mining (also called block withholding) can be very difficult to launch. 51%-attacks correlates to 51% of the BC nodes are somehow compromised using Sybil-type schemes. Double-spending attacks and remediation of those attacks are discussed above. DDoS attack is the same kind of attacks that happen in classical networks and similar remedies like those of classical networks can be applied for the BC network. Selfish-mining attacks can occur when the attackers have much more computing resources power to overwhelm the honest miners. However, unlike public BC, the permissioned enterprise BC network can easily overcome those attacks with easy design trade-offs where the robust centralized authority/controller performs service provisioning.

The scope of the BC-based enterprise network can be considered large. Aspects disclosed herein can provide additional overhead traffic as well as spending hashing computing power by sending the hash-based header of an individual block (or transaction) over the BC network (e.g., while sending an encrypted individual block or transaction simultaneously directly to the destination using non-BC portion of the network) as illustrated in FIG. 2. This BC itself can be considered an additional price (e.g., by way of overhead traffic and CPU power) that is paid for robust security and tamper-proof validation and thereby preventing cyber-attacks. This can be configured such that a transaction or block will only be accepted at the destination when its own-validation corresponds with that of the independent-validation sent by the BC network. Table V shows performance parameters for the proposed enterprise network.

TABLE V

ENTERPRISE NETWORK PERFORMANCE PARAMETERS

| Parameter | Description |
| --- | --- |
| $t_{ETE}$ | One-way end-to-end delay directly sent from the source to the destination for a transaction (without using the BC network) =>> Function of delays (encryption/decryption, processing, queueing, processing, transmission, and propagation) for the total number of hops (i.e. routers involved) plus processing delays in the source and the destination entity; again queueing delay depends on the channel capacity and traffic load |

TABLE V-continued

ENTERPRISE NETWORK PERFORMANCE PARAMETERS

| Parameter | Description |
| --- | --- |
| $t_{BC}$ | One-way delay between the source and the destination for a transaction that is sent via the BC network =>> Function of delays (encryption/decryption, processing, queueing, processing, transmission, and propagation) for the total number of hops (i.e. routers and BC nodes involved) plus processing delays in the source and the destination entity; again queueing delay depends on the channel capacity and traffic load |
| n | Total number of transactions (assuming this number remains the same for both BC and non-BC network) |
| $m_E$ | Size of a transaction (in bits) directly sent to the destination by the source (without using the BC network); again the size of a transaction is a function CF filter size |
| $m_{BC}$ | Size of a transaction/header field (in bits) sent to the destination by the source using the BC network |
| $m_{OH}$ | Total overhead (OH) signaling traffic generated by BC network: $m_{OH} = nm_{BC}$ |
| $R_E$ | Total number of routers involved for a transaction whose delay has been $t_{ETE}$ |
| $N_{BC}$ | Total number of BC nodes involved for a transaction/block header (whose delay has been $t_{BC}$) |
| $R_{BC}$ | Total number of routers involved for a transaction between SE and DE (whose delay has been $t_{BC}$) |
| $t_A$ | Actual one-way delay between SE and DE for a transaction (accounting both BC and non-BC): $t_A = \max\{t_{ETE}, t_{BC}\}$ |
| $s_A$ | Net throughput capacity(in bits per second [bps]) accounting both BC and non-BC $s_A = nm_E/t_A$ |
| $s_{ETE}$ | Net throughput capacity(in bits per second [bps]) with no BC network: $s_{ETE} = nm_E/t_{ETE}$ |
| F | Ratio in percentage: $F = (s_A/s_{ETE})100\%$ |

A delay over the BC network can be considered an important factor: if $t_{BC}$ is greater than $t_{ETE}$, it can reduce net throughput by a factor of $F=(s_A/s_{ETE})100\%$. In one example, a network can have the transaction rate of the order of only 1 transaction per 10 minutes and a transaction size is about 1 Megabytes (MB) on average. While tolerable for some networks can be severely impact the resources of military networks. Even the use of CF filters or high-speed transmission lines may not help, because $t_{BC}$ depends primarily on the hash processing time of the transaction/block "header" only where CF filters are not used and the transmission time of a header is negligible.

Fortunately, the permissioned BC-based enterprise network has many alternatives in designing the BC network. Of course, if the CPU speed of the BC node is increased, $t_{BC}$ will be reduced to some extent. However, it may not be enough for increasing throughput. The transaction rate (e.g., 1 transaction/10 minutes) of a non-military network can be based on the combined mining power a computer used. So, increasing the CPU power may not be enough. Rather, an intelligent consensus algorithm can be used that takes negligible time making $t_{BC} \leq t_{ETE}$. This hash processing time of the header of a transaction/block can be a main factor that contributes in increasing $t_{BC}$.

In one example, suppose there is a network where $t_{BC}$ is less than $t_{ETE}$. Then $t_{ETE}$ can be a main factor in limiting the throughput capacity. If the transaction sizes are larger, $t_{ETE}$ can be higher and vice versa. The transaction sizes can be reduced using CF filters. The CF filters can be used to help to reduce the bandwidth drastically for the signature sharing application. In one example, two sub-servers and one master server can be employed where the master server acts the signature controller. The master server receives the signatures sent by two sub-servers in the form of CFs and forms composite CF (CCF) as appropriate. The master server then broadcasts the CCF to users back in the network. The use of CF filters reduce the bandwidth requirement for sending signatures by about 99.55% to 99.99% at the negligible cost in FPR (0.92%-7.20%) by varying different CF parameters shown in Tables I and II. In other words, the use of CF filters reduce the transaction sizes. Consequently, the transaction transfer time (say, $t_{ETE}$) is reduced over the network, thereby increasing the network throughput (say, $S_{ETE}$).

Extending this example for using the BC network, the net throughput capacity can be reduced by a factor of percentage point $F=(s_A/s_{ETE})100\%$ assuming that $t_{BC}$ is less than $t_{ETE}$. This high-level analysis provides an idea how different trade-offs can be used in designing the permissioned BC-based enterprise network for commercial or military purposes.

In view of this, there are benefits of the centralized P2P key and storage management architecture as the BC network itself has the P2P architecture. P2PSIP can be used as a signaling protocol over the P2P-BC network to take advantage of the unicast DHT routing, although other protocols can be used. Also, an algebraic consensus algorithm can be used and can be scalable. The cuckoo filter is both secure and bandwidth-efficient for transaction-type applications as well as other application. BC-specific cyber-attacks can be easily prevented in the permissioned BC network simply denying their access in addition to BC's near immutability capability. The hybrid C/S and P2P networking can coexist because of a huge number of C/S applications exits in the field.

Figure 3:
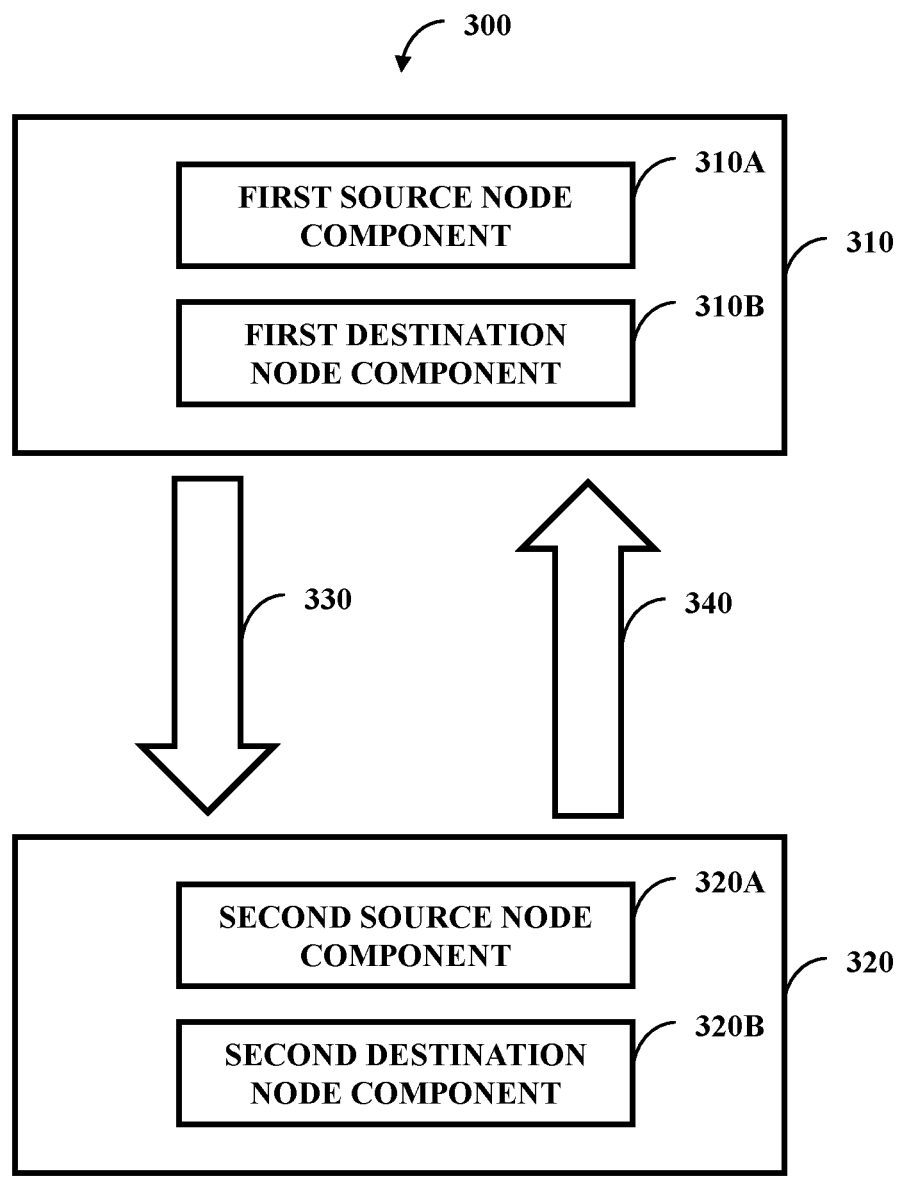
FIG. 3 illustrates one embodiment of a network comprising a first node and a second node.

FIG. 3 illustrates one embodiment of a network 300 comprising a first node 310 and a second node 320. The nodes 310 and 320 can individually include a source component (first 310A and second 320A) and a destination component (first 310B and second 320B). The nodes 310 and 320 can function with source and destination features by way of their individual components.

The first source node component 310A can be configured to send a first transaction 330 along an enterprise network (e.g., the network described in FIG. 2). The first destination node component 310B can be configured to receive a second transaction 340 by way of the enterprise network. Similarly, the second source node component 320A can be configured to send the second transaction 340 along an enterprise network. Additionally, the second destination node component 320B can be configured to receive the first transaction 330 by way of the enterprise network.

The enterprise network can comprise a block chain network and a non-block chain network. The block chain network can, at least one embodiment, be a permissioned block chain network managed by an authority and/or employ a peer-to-peer session initiation protocol A part of the first transaction 330 (e.g., a first header) and a part of the second transaction 340 (e.g., a second header) can be sent along the block chain network and be encrypted by way of a hash-based cuckoo filter. Another part of the first transaction 330 (e.g., a remainder) and another part of the second transaction 340 can be sent along the non-block chain network. The first transaction and the second transaction can be non-identical and be encrypted, at least in part by separate encryption key sets.

The first node 310 can second node 320 can be entities that are part of the enterprise network, such as a network that employs an algebraic consensus algorithm to find a hash value with regard to the hash-based cuckoo filter. While illustrated as directly communicating with one another, other implementations can be practiced. In one example, the nodes 310 and 320 can be sub-servers (e.g., slave servers) to a master server—the first node 310 can be a first sub-server and the second node 320 can be a second sub-server. The master server can be configured to receive a first signature set from the first sub-server and configured to receive a second signature set from a second sub-server. The master server (or a node with direct communication) can be configured to use the first signature set and the second signature set for communication validation with regard to the block chain network (e.g., the validate at least part of the transaction).

Figure 4:
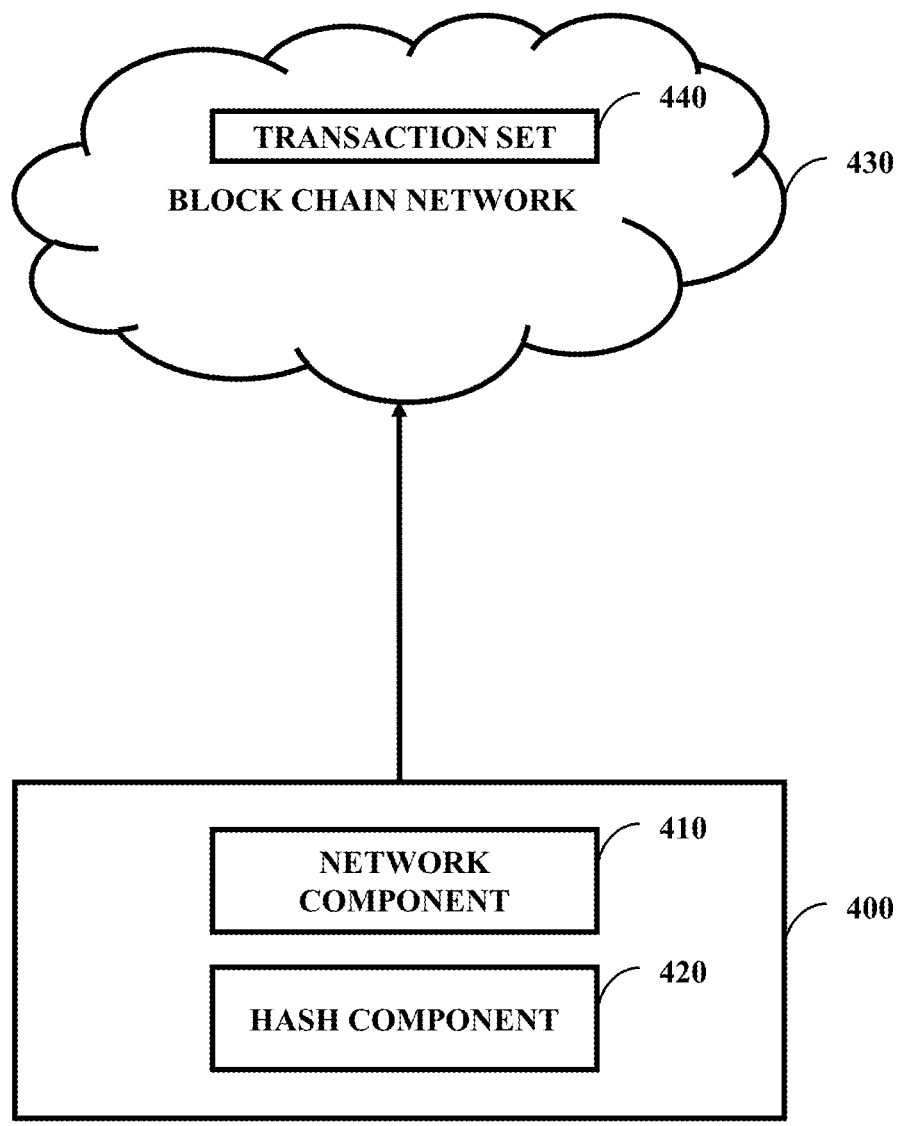
FIG. 4 illustrates one embodiment of a system comprising a network component and a hash component.

FIG. 4 illustrates one embodiment of a system 400 comprising a network component 410 and a hash component 420. The network component 410 can be configured to manage a block chain network 430 with a block chain-based network architecture (e.g., as illustrated in FIG. 2). The hash component 420 can be configured to use a hash-based cuckoo filter upon a transaction set 440 for the block chain network 430 (e.g., a portion of the transaction set for communication along the block chain network 430).

The transaction set can comprise one or more individual transactions, with an individual transaction comprising a header and a payload. The header can be transmitted along the block chain network 430. The block chain network 430 can employ peer-to-peer session initiation protocol and/or be a permissioned block chain network managed by an authority. The block chain network 430 can, along with a non-block chain network, be part of an enterprise network with the enterprise network employing an algebraic consensus algorithm to find a hash value with regard to the hash-based cuckoo filter. The non-block chain network can be used to transmit the payload or a hash of the payload.

Figure 5:
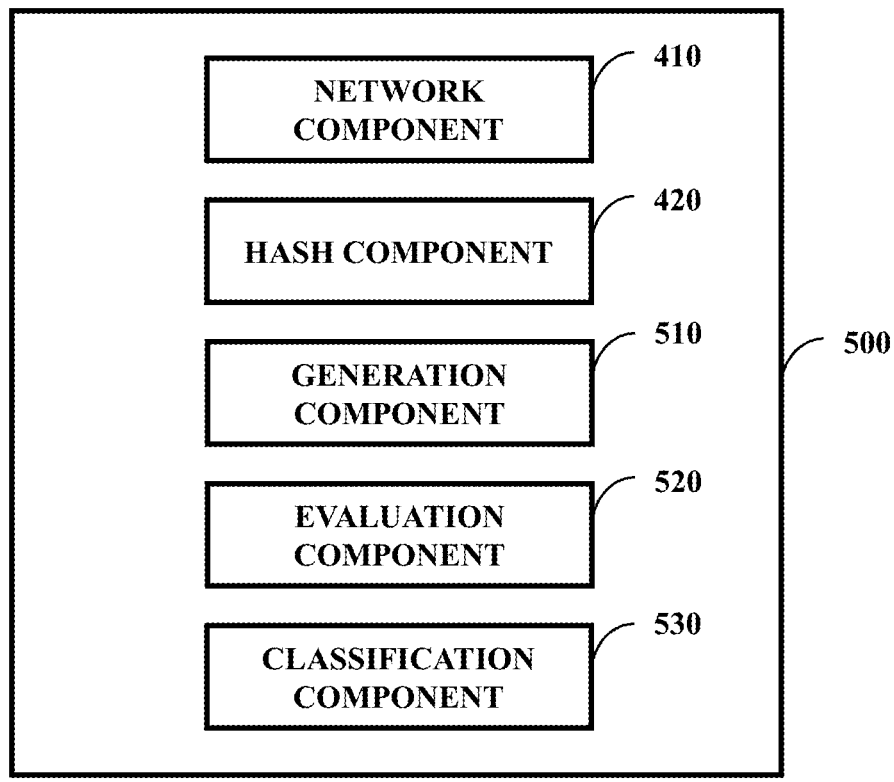
FIG. 5 illustrates one embodiment of a system comprising the network component, the hash component, a generation component, an evaluation component, and a classification component.

FIG. 5 illustrates one embodiment of a system 500 comprising the network component 410, the hash component 420, a generation component 510, an evaluation component 520, and a classification component 530. The generation component 510, which can be part of the block chain network 430 of FIG. 4, can be configured to generate an encryption key set. The encryption key set can comprise a key set for communication of the header along the block chain network 430 of FIG. 4 and a key set for communication of the hash along the non-block chain network.

Some transactions (transactions being interchangeable with blocks for purposes herein) can be appropriate for filtering and others not. The evaluation component 520 can be configured to evaluate the transaction set to produce an evaluation result. The classification component 530 can be configured to classify the transaction set as filterable or non-filterable based (e.g., able to be filtered or desirable to be filtered), at least in part, on the evaluation result. When the transaction set is classified as filterable, then the hash component 420 can be configured to use the hash-based cuckoo filter upon the transaction set and when the transaction set is classified as non-filterable, then the hash component 420 can be configured to not use the hash-based cuckoo filter upon the transaction set.

Figure 6:
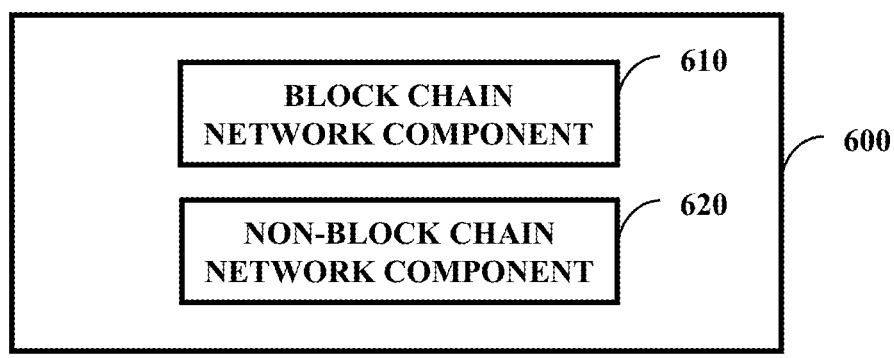
FIG. 6 illustrates one embodiment of a system comprising a block chain network component and a non-block chain network component.

FIG. 6 illustrates one embodiment of a system 600 comprising a block chain network component 610 and a non-block chain network component 620. The block chain network component 610 can be configured to send a header of a block (e.g., transaction) over a block chain network (e.g., as illustrated in FIG. 2) that is part of an enterprise network, with the header being encrypted by way of a hash-based cuckoo filter. The non-block chain network component 620 can be configured to send a non-header of the block over a non-block chain network (e.g., as illustrated in FIG. 2, being the part of the enterprise network not the block chain network) that is part of the enterprise network. In one embodiment, the non-header is a hash of a payload of the block and not the payload itself and the hash of the payload is produced by way of the hash-based cuckoo filter. The system 600 can manage communication over the entire enterprise network, such as an enterprise network that employs an algebraic consensus algorithm to find a hash value with regard to the hash-based cuckoo filter.

In one embodiment, the system 600 (or other systems) can be configured to function with other components disclosed herein. As an example, the system 600 can comprise the generation component 510 of FIG. 5 that can configured to generate an encryption key set. The encryption key set can comprise a key set for communication along the block chain network and a key set for communication along the non-block chain network. The block chain network can employ peer-to-peer session initiation protocol and/or can be a permissioned block chain network managed by an authority.

The system 600 can function with multiple communications along the block chain network and the non-block chain network. As an example, the block chain network component 610 can send a first header of a first block and also receive, by way of the block chain network, a second header of a second block. Similarly, the non-block chain network component 620 can send a first non-header and received, by way of the non-block chain network, a second non-header of a second block.

Figure 7:
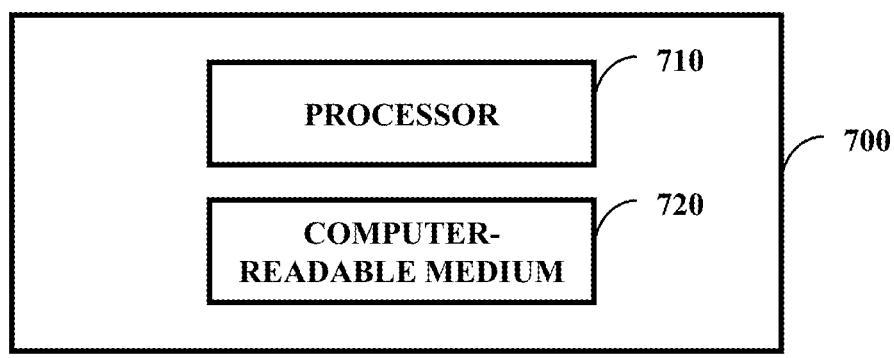
FIG. 7 illustrates one embodiment of a system comprising a processor and a computer readable medium.

FIG. 7 illustrates one embodiment of a system 700 comprising a processor 710 and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the hash component 420 of FIG. 4). In one embodiment, at least one component disclosed herein (e.g., the first source node component 310A of FIG. 3) can be implemented, at least in part, by way of non-software, such as implemented as hardware by way of the system 700. In one embodiment, the computer-readable medium 720 is configured to store processor-executable instructions that when executed by the processor 710, cause the processor 710 to perform at least part of a method disclosed herein (e.g., at least part of one of the methods 800 or 900 discussed below).

Figure 8:
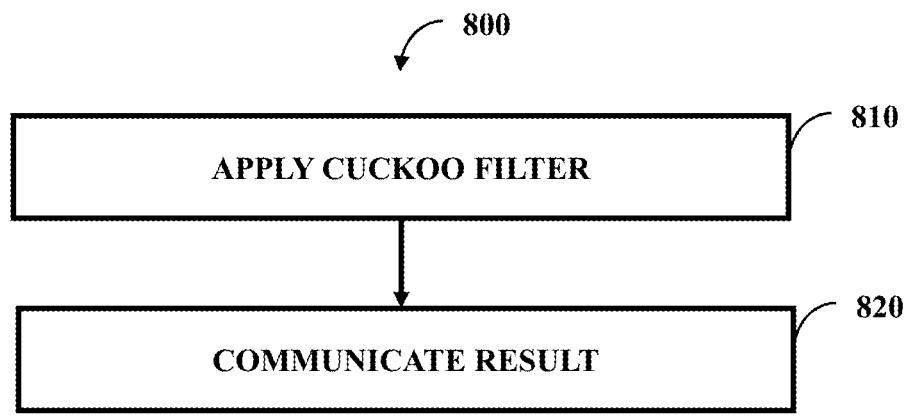
FIG. 8 illustrates one embodiment of a method comprising two actions.

FIG. 8 illustrates one embodiment of a method 800 comprising two actions 810-820. At 810, the hash-based cuckoo filter can be applied. The result of this filter application can be communicated at 820, such as along the block chain network 430 of FIG. 4.

Figure 9:
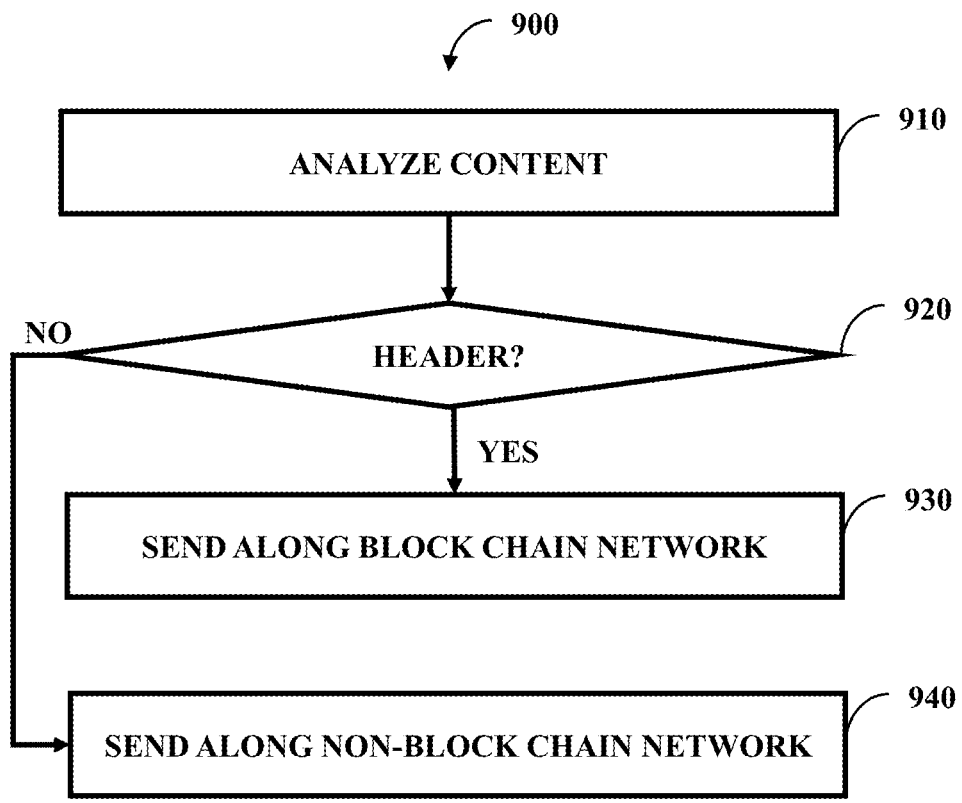
FIG. 9 illustrates one embodiment of a method comprising four actions.

FIG. 9 illustrates one embodiment of a method 900 comprising four actions 910-940. At 910, content for sending can be analyzed. Part of this analysis can be breaking down a transaction into a header portion and non-header portion or analyzing a part of a transaction already broken down. At 920, a check can occur to determine if content to be sent is a header. If the content to be sent is a header, then the content can be sent along the block chain network. Conversely, if the content to be sent is not a header, then the content can be sent along the non-block chain network.

While the methods disclosed herein are shown and described as a series of blocks, it is to be appreciated by one of ordinary skill in the art that the methods are not restricted by the order of the blocks, as some blocks can take place in different orders.

What is claimed is:

1. A system, comprising:
a network component configured to manage a block chain network with a block chain-based network architecture; and
a hash component configured to use a hash-based cuckoo filter for a transaction set for the block chain network,
where the block chain network is part of an enterprise network,
where a non-block chain network is part of the enterprise network,
where the transaction comprises a header and a payload,
where the header is transmitted along block chain network,
where a hash of the payload is transmitted along the non-block chain network, and
where the network component, the hash component, or a combination thereof implement, at least in part, by way of non-software.

2. The system of claim 1, comprising:
a generation component configured to generate an encryption key set,
where the generation component is part of the block chain network, and
where the encryption key set comprises a key set for communication of the header along the block chain network and a key set for communication of the hash along the non-block chain network.

3. The system of claim 1,
where the enterprise network employs an algebraic consensus algorithm to find a hash value with regard to the hash-based cuckoo filter.

4. The system of claim 1,
where the block chain network employs peer-to-peer session initiation protocol.

5. The system of claim 1,
where the block chain network is a permissioned block chain network managed by an authority.

6. A system of claim 1, comprising:
a network component configured to manage a block chain network with a block chain-based network architecture; and
a hash component configured to use a hash-based cuckoo filter for a transaction set for the block chain network;
an evaluation component configured to evaluate the transaction set to produce an evaluation result; and
a classification component configured to classify the transaction set as filterable or non-filterable based, at least in part, on the evaluation result,
where when the transaction set is classified as filterable, then the hash component is configured to use the hash-based cuckoo filter upon the transaction set,
where when the transaction set is classified as non-filterable, then the hash component can be configured to not use the hash-based cuckoo filter upon the transaction set, and
where the network component, the hash component, the evaluation component, the classification component, or a combination thereof implement, at least in part, by way of non-software.

7. The system of claim 6,
where the block chain network employs peer-to-peer session initiation protocol.

8. A non-transitory computer-readable medium that is communicatively coupled to a processor and stores a command set executable by the processor to facilitate a component set, the component set comprising:
a block chain network component configured to send a header of a block over a block chain network; and
a non-block chain network component configured to send a non-header of the block over a non-block chain network,
where the block chain network and the non-block chain network are part of an enterprise network and
where the header of the block is encrypted by way of a hash-based cuckoo filter.

9. The non-transitory computer-readable medium of claim 8, comprising:
a generation component configured to generate an encryption key set,
where the encryption key set comprises a key set for communication of the header along the block chain network and a key set for communication of the non-header along the non-block chain network.

10. The non-transitory computer-readable medium of claim 9,
where the enterprise network employs an algebraic consensus algorithm to find a hash value with regard to the hash-based cuckoo filter.

11. The non-transitory computer-readable medium of claim 10,
where the non-header is a hash of a payload of the block and not the payload itself and
where the hash of the payload is produced by way of the hash-based cuckoo filter.

12. The non-transitory computer-readable medium of claim 11,
where the block chain network employs peer-to-peer session initiation protocol.

13. The non-transitory computer-readable medium of claim 12,
where the block chain network is a permissioned block chain network managed by an authority.

14. The non-transitory computer-readable medium of claim 13,
where the header is a first header of a first block,
where the non-header is a first non-header of the first block,
where the block chain network component is configured to receive a second header of a second block over the block chain network, and
where the non-block chain network component is configured to receive a second non-header of a second block over the non-block chain network.

15. A system, comprising:
a source node component configured to send a first transaction along an enterprise network; and
a destination node component configured to receive a second transaction by way of the enterprise network,
where the enterprise network comprise a block chain network and a non-block chain network,
where part of the first transaction is sent along the block chain network,
where part the first transaction is sent along the non-block chain network,
where the part of the first transaction that is sent along the non-block chain network is encrypted by way of a hash-based cuckoo filter,
where part of the second transaction is received along the block chain network,
where part the second transaction is received along the non-block chain network,
where the part of the second transaction that is sent along the non-block chain network is encrypted by way of the hash-based cuckoo filter,
where the first transaction and the second transaction are not identical, and
where the source node component, the destination node component, or a combination thereof implement, at least in part, by way of non-software.

16. The system of claim 15, comprising:
where the source node component and the destination node component implement on a first sub-server,
where the first sub-server is a slave to a master server,
where the master server is configured to receive a first signature set from the first sub-server and configured to receive a second signature set from a second sub-server, and
where the master server is configured to use the first signature set and the second signature set for communication validation with regard to the block chain network.

17. The system of claim 15,
where the part of the first transaction sent along the block chain network employs a first encryption key set,
where the part of the first transaction sent along the non-block chain network employs a second encryption key set,
where the first encryption key set and the second encryption key set are separate key sets.

18. The system of claim 15,
where the enterprise network employs an algebraic consensus algorithm to find a hash value with regard to the hash-based cuckoo filter.

19. The system of claim 15,
where the block chain network employs peer-to-peer session initiation protocol.

20. The system of claim 15,
where the block chain network is a permissioned block chain network managed by an authority.

* * * * *